April 12, 1949.  O. H. SAMUELSON  2,467,000
VACUUM BLOW HEAD

Filed March 2, 1945  3 Sheets-Sheet 1

INVENTOR.
OTTO H. SAMUELSON
BY W. P. Hahn
ATTORNEY

April 12, 1949.   O. H. SAMUELSON   2,467,000
VACUUM BLOW HEAD
Filed March 2, 1945   3 Sheets-Sheet 3

INVENTOR.
OTTO H. SAMUELSON
BY W. P. Hahn
ATTORNEY

Patented Apr. 12, 1949

2,467,000

UNITED STATES PATENT OFFICE 2,467,000

VACUUM BLOW HEAD

Otto H. Samuelson, Muncie, Ind., assignor, by direct and mesne assignments, to S. & Z. Manufacturing Company, Inc., Indianapolis, Ind., a corporation of Indiana Application March 2, 1945, Serial No. 580,649

2 Claims. (Cl. 49—18)

The present invention relates to apparatus for forming hollow glass containers.

More specifically, the present invention relates to apparatus for blowing hollow glass containers, such as bottles or the like, and has for one of its objects that of providing apparatus for blowing hollow glass containers in a minimum of time and with a maximum of perfection of the container.

Heretofore, particularly in the commercial art, considerable difficulty has been experienced in evacuating the air normally contained in the mold, after the same has been closed upon the blank, to permit the expansion of the blank, while in its plastic state, by the blowing air admitted to the interior of the blank. Escape openings in the mold body have been provided and through which the air within the mold and surrounding the blank, has been permitted to escape. This air is forced out by the expansion of the blank under the influence of the pressure applied to the interior of the blank. Due to the fact that this air cannot escape rapidly, the shaping of the blank within the mold has to be proceeded with at a relatively slow rate, in order that the air may bleed out through the escape openings under the pressure exerted by the expanding walls of the blank.

The escape openings in the mold have to necessarily be extremely small, to prevent the material of the blank being forced into these openings, thus causing bumps on the surface of the finished article, resulting in an unfinished occurrence of the article, and in some cases, resulting in a weakening or checking of the surface at this point.

The number of vents, even though small, cannot be unduly multiplied to increase the venting time of the mold because of the fact that there is a certain weakening in the glass surface, resulting from the use of any vent and an undue multiplication of the vents to permit rapid escape of the trapped air would result in a weakened finished article.

It is, therefore, obvious that the number of vents cannot be unduly increased to permit rapid venting. Accordingly, the rate of blowing must be adjusted to the slow rate of venting of the mold, resulting in a considerable slowing up of the molding process.

It is one of the objects of my invention to provide means whereby the venting of the mold may be accomplished in an extremely rapid manner to thereby reduce the blowing time.

It is another object of my invention to provide means whereby the external pressure on the blank, while in the mold, may be reduced practically to zero or less, if desired, to permit the more rapid expansion of the plastic glass in the mold under the blow pressure admitted internally to the blank.

Other objects and advantages of my invention will appear more fully hereinafter in the appended specification and claims.

For the purpose of disclosing my invention, I have illustrated an embodiment thereof in the accompanying drawings, in which.

Figure 1:
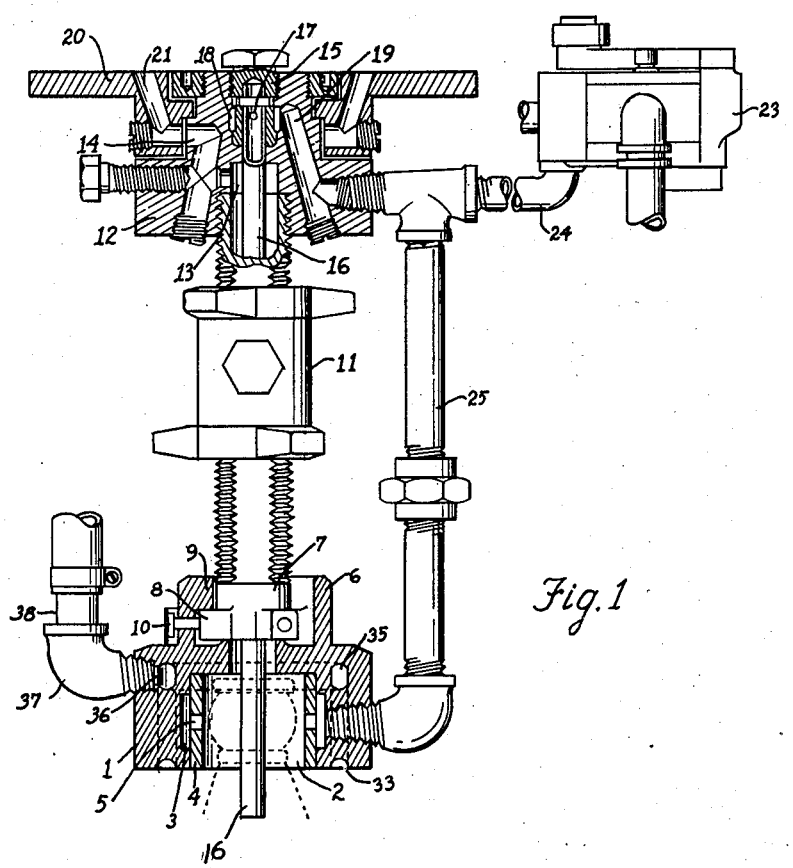
Fig. 1 is a longitudinal sectional view, partly in elevation, of a blow head embodying my invention.
Figure 3:
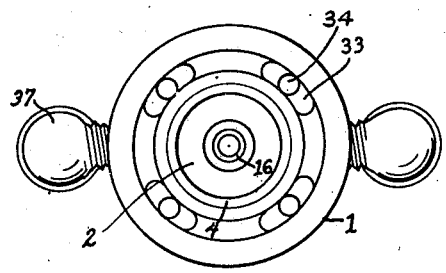
Fig. 3 is a bottom plan view of the blow head.

In the embodiment illustrated, the cap 1 of the blow head is adapted to make tight engagement, on its bottom surface, with the top surface of the mold.

This cap 1 is provided with a central recess 2 to adapt it to receive the neck of the container, or the neck of the blank to be shaped into a container. The wall of the recess 2 is provided with an annular channel 3 over which is fitted a liner 4, provided with openings 5, through which radial streams of air may be delivered to the neck of the container. The top of the cap 1 is provided with a neck 6 receiving the lower end of a hollow stem 7. This lower end is provided with radial lugs 8 engaging beneath inwardly projecting lugs 9 in the neck to prevent longitudinal displacement of the cap relatively to the stem, while at the same time permitting ready removal of the cap from the stem. After the cap 6 has been rotated to lock the two parts together, relative rotative movement between the parts may be prevented by pins such as 10. The hollow stem 7 is preferably screw threaded to receive a supporting sleeve 11, which sleeve may be received by a supporting arm for vertically raising and lowering the blow head unit into and out of engagement with the mold.

The upper end of the sleeve 7 is threaded into a valve block 12, having an enlarged recess 13 communicating with an escape port 14. The top of this valve block 12 receives a threaded plug 15 supporting an air delivery tube 16 extending the length of the hollow sleeve 7 and being adapted to project into the blank within the mold. This tube 16 at its upper end communicates through a port 17 with an annular channel 18, in turn communicating with an inlet port 19 in the valve block 12.

For controlling the port 14, I provide a rotatable valve member 20 having ports 21 adapted, when the valve member is rotated to the correct position, to coincide with the port 14. This valve member may be in the form of a star wheel which may engage suitable operating fingers during the movement of the blow head in its orbit on the supporting machine.

Blowing and cooling air under pressure may be admitted through the port 19 from a suitable source of air under relatively low and high pressures through a valve 23 connected by a suitable conduit 24 with the inlet port 19, and air to the channel 3 may be admitted by a branch conduit 25.

The cap 1, as heretofore explained, is adapted to make sealing engagement with the blow mold 26 which may be formed in two halves, vertically separable and having meeting faces 27. The cavity of the mold may take any desired form to give the desired shape to the hollow container, and is herein illustrated as being of a shape to produce a necked bottle having a rounded top shoulder. To this end the cavity is provided with a body forming portion 26', a shoulder forming portion 26'' and a neck forming portion 26'''. The neck proper has been previously formed in the parison mold before the parison is inserted in the mold 26. Each mold section is provided with a plurality of diagonally disposed air passages 28, which are directed from an escape opening 29 outwardly towards the outer surface of the mold, and a secondary set of escape passages 30 which are directed inwardly from an escape opening 29 toward the inner wall of the mold cavity. These escape passages communicate with a plurality of vent openings 31 extending from the surface of the mold cavity outwardly to the passages and, it is to be noted that these vent openings are arranged at the point in the mold cavity where the shoulder of the container is adapted to be formed and at the point where the shoulder of the container merges to the neck.

The face of each mold section is provided with half air passages 28', 29' and 30' corresponding to the halves of the passages 28, 29 and 30, so that when the faces of the mold sections meet, complete air passages will be formed. These air passages communicate with slightly recessed portions 32'' formed in the meeting faces of the mold sections and extend from a point 32 to a point 32', so that when the mold sections are closed, passageways may be formed, communicating with passages 28 and 30. These recesses in the faces of the mold sections are not very deep. However, this is sufficient to permit the escape of the air within the mold from the mold cavity at the meeting faces. If desired, these recesses may be extended downwardly to a point near the bottom of the sections, say within one inch from the bottom of the mold cavity.

The cap 1 is provided on its bottom face, with a plurality of grooves 33, each groove being of sufficient width to cover two of the escape ports 29 in the top of the mold. These grooves 33 communicate by suitable passageways 34 with an annular channel 35 in the cap. The annular passage 35, through a suitable passageway 36, communicates with a nipple 37 and a suitable conduit 38 is secured to this nipple, which conduit extends to a vacuum timing valve 39, in turn connected by conduit 40 with a suitable vacuum pump.

The vacuum timing valve is operated by suitable mechanism to admit subatmospheric pressure to the interior of the mold simultaneously with the admission of blowing pressure to the interior of the blank within the mold, and this subatmospheric pressure is continued throughout the interval that any air under pressure is being admitted to the interior of the blank to be shaped.

The operation of the apparatus may be readily understood. As soon as the hollow blank 41 which has been rendered plastic by heat, is received in the mold, the two halves are closed sealing the mold cavity, and the blow head is lowered until the cap 1 is in sealing engagement with the top of the mold. Air under relatively low pressure is then admitted to the interior of the blank 41, this admission being controlled by the valve 23 and being delivered through the inlet tube 16. During this interval of admitting blowing air under pressure to the blank, the escape port 14 is closed. However, at the same time that air under blowing pressure is admitted to the interior of the blank, the timing valve 39 is opened to connect the annular passage 35 in the cap 1 with a vacuum pump, so that any air which may be within the mold cavity and surrounding the blank 41 is exhausted. This creates a subatmospheric pressure on the exterior walls of the blank, while above atmospheric pressure is admitted to the interior of the blank, thereby rapidly expanding the blank against the walls of the mold cavity to give it the desired form.

When the air under blowing pressure is admitted to the interior of the blank, the pressure commences to build up from the bottom of the blank towards the top. Therefore, the blank is expanded from the bottom towards the top and such air which may be contained in the mold and surrounding the blank is forced towards the top of the mold and exhausted through the vent openings 31. This expansion of the blank takes place very rapidly, and heretofore, in commercial production, there has been a tendency for the air surrounding the blank to be trapped by the expansion of the blank in the contact with the walls of the mold cavity at the shoulder, resulting in a depression being formed either at the shoulder or surrounding the neck. In my invention, it is to be noted, that the vent openings 31 are so disposed that together with a vacuum being pulled on the vents, there is no possibility of air being trapped at any point within the mold cavity.

After the air under blowing pressure has been admitted to the interior of the blank for a sufficient length of time for the blank to have been properly shaped within the mold cavity, this air under blowing pressure is shut off by suitably closing the valve 23. Air under higher pressure, and therefore at a greater velocity, is then admitted through the tube 16 to the interior of the now shaped blank, while at the same time the valve 20 is rotated to vent the port 14 so that air under relatively high velocity is unobstructedly blown through the shaped container, thereby cooling the same and causing the shaped container to set quickly. However, during the passage of the cooling air, through the shaped container, the timing vacuum valve remains open, thus tending to hold the shaped container against the walls of the mold cavity during the cooling process. As soon, however, as the cooling air is shut off, which is done at the proper interval, the timing vacuum valve is shut off and the mold is ready to open for the delivering of the shaped container therefrom.

Figure 4:
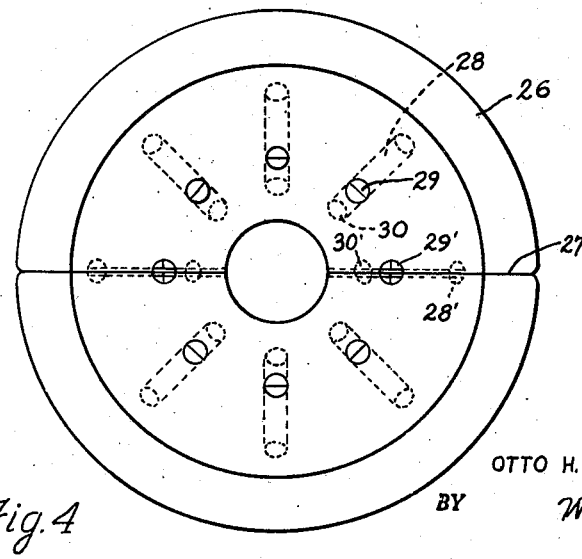
Fig. 4 is a top plan view of a mold to be associated with the blow head.
Figure 5:
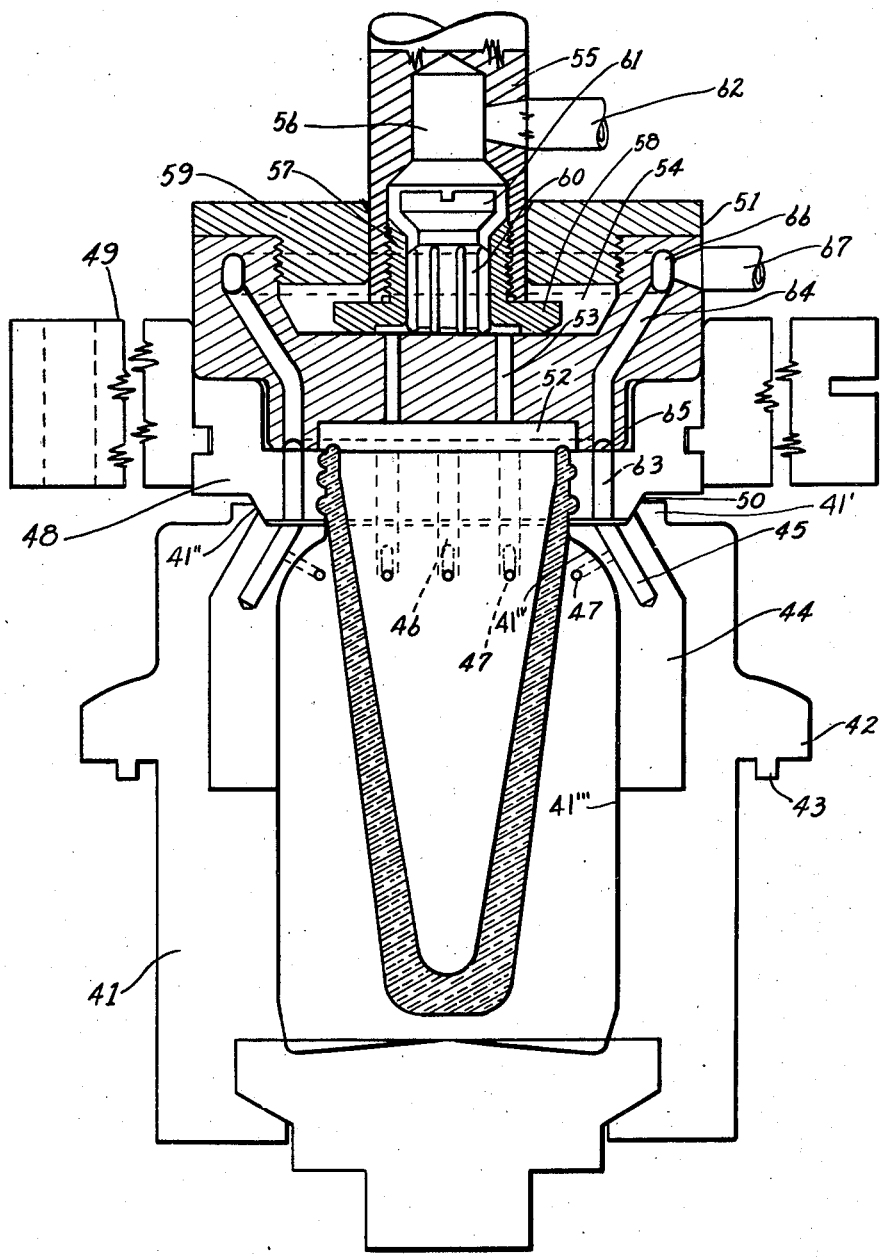
Fig. 5 is a longitudinal sectional view, partly in elevation, of a modified form of blow head and mold.

In Fig. 5, I have illustrated a modification of the structure illustrated in Figs. 1 and 4. In this figure, I have shown a mold and its associated blow head for forming containers in the form of glass jars or the like, wherein the jar is provided with a wide mouth, threaded top or neck.

In this structure, the mold 41 is formed in two sections, as is the mold illustrated in Figs. 1 and 4, and is provided with an annular flange 42 with interlocking portions 43 adapted to rest upon and interlock with the supporting members for the sections of the mold. This mold, like the molds illustrated in Fig. 2, has formed on the meeting faces of the two sections recesses 44, which are provided with the half portions of the air passages 45 terminating at the top of the mold. Similar discharge air passages 46 are provided in the top portion of the mold. All of these passages communicate with diagonally radially extending escape ports 47 leading to the interior of the mold proper. The top of the mold is provided with an annular flange 41' having the tapered inner walls 41''. The top of the mold is adapted to make sealing engagement with a neck mold 48 suitably supported by a supporting ring 49, and this neck mold has tapered outer side walls 50 which make engagement with the tapered walls 41'' of the mold flange.

Figure 2:
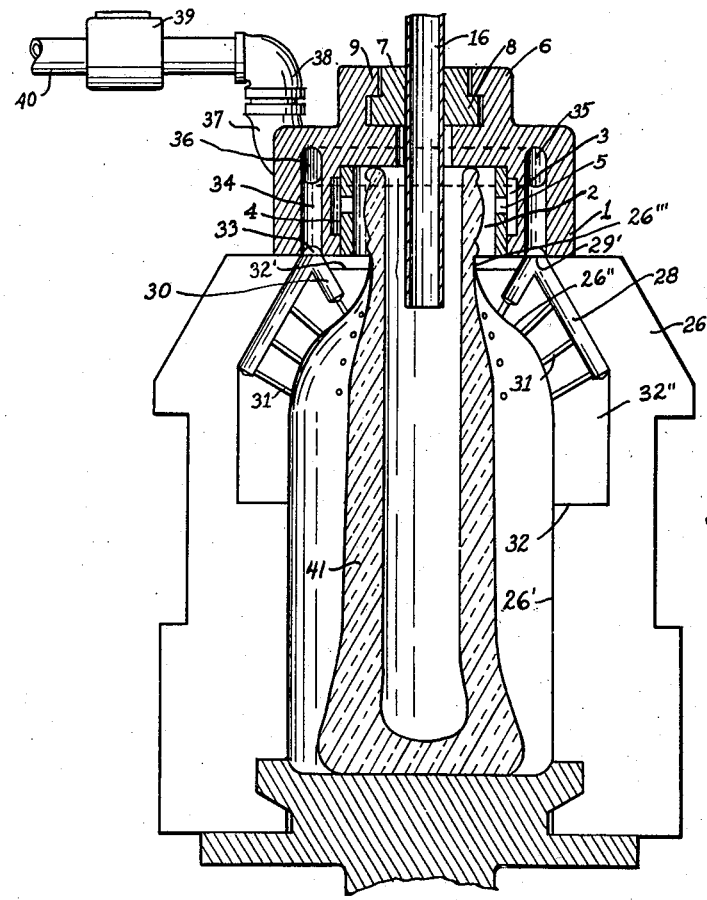
Fig. 2 is a longitudinal sectional view of a mold associated with said blow head for the purpose of carrying out my invention.

This mold cavity like the mold cavity in Fig. 2, is provided with a body forming portion 41''' and a shoulder forming portion 41$^{IV}$, although the neck proper in this structure is formed in the neck mold 48.

Cooperating with the mold and neck mold is a blow head 51. This blow head on its under face is provided with an air delivery recess 52 communicating through ports 53 with a top opening 54 in the blow head. Blowing air is delivered to the opening 54 through the medium of a stem 55 provided at its lower end with an opening 56. The lower end of this opening 56 is provided with a threaded plug 57 flanged as at 58, and having a central bore. The top of the opening 54 is closed by a threaded plug 59, so that during the reciprocating movement of the stem 55 the flange 58 will, through a lost motion movement between the flange 58 and the plug 59, raise and lower the blow head. Fitting within the hollow bore of the plug 57 is a movable valve 60. This valve, when the stem 55 is raised, is lowered by gravity to seat the valve head 61, thereby sealing the opening 56 against the escape of fluid under pressure. However, when the stem 55 is lowered to the limit of its movement, the flange 58 makes sealing engagement with the bottom wall of the recess 54, raising the valve head 61 from its seat and permitting the escape of fluid under pressure through the openings 53 into the blank within the mold, thereby expanding the same against the walls of the mold.

Fluid under pressure is admitted to the opening 56 in the stem 55 through the medium of a side pipe 62 leading to a source of fluid under pressure, suitably controlled by valve mechanism.

The neck mold 48 is provided with air passages 63 coinciding with the air passages 45 and 46 in the mold and the blow head is provided with air passages 64 terminating in annular grooves 65, on the face of the blow head, which grooves coincide with or overlie the openings 63. An annular channel 66 is provided in the upper portion of the blow head, which communicates with the passages 64 and also with an outlet pipe 67, connected with a suitable vacuum pump through a timing valve, in a manner similar to that heretofore described with respect to the structure illustrated in Fig. 2.

The stem 55 may be raised and lowered by any suitable reciprocating mechanism, as for instance, a piston operating in a steam cylinder or by another desirable arrangement.

After the mold 41 has received its blank and has been closed, the blow head is lowered through the reciprocating movement of the stem 55, the neck ring making sealing engagement with the top of the mold and the blow head making sealing engagement with the top of the neck ring. This lowering movement, after the seal has been effected, opens the valve 60, thereby admitting blowing pressure to the blank within the mold, to thus expand the same and at the same time, the exhaust ports through the pipe 67 and the timing valve are connected with the vacuum pump, so that a vacuum or subatmospheric pressure is provided within the mold on the exterior of the blank, and at the same time fluid under pressure is delivered to the interior of the blank, thus rapidly expanding the blank into the mold to be shaped, in accordance with the shape of the mold.

I claim:

1. In combination, a finishing mold having a closed bottom mold cavity adapted to receive a hollow blank in its plastic state to be formed into a finished hollow article having a neck and provided with vent openings extending from the mold cavity to the exterior of the mold and terminating at the top surface of the mold, a blow head adapted for cooperation with said mold comprising a hollow stem, an air delivering tube extending through and beyond said stem for projection into the mold cavity, a control valve mounted at the upper end of said stem and controlling the ingress of air under compression through said tube and the egress of air from the interior of the article to be formed through said stem and a blow head member supported from the bottom end of said stem, said member having a bottom face adapted to make sealing engagement with the top face of the mold and provided with an interior recess for the reception of a container neck, said recess having a top opening communicating with said hollow stem and accommodating the air inlet tube, an annular passage formed in said blow head member concentric with said recess, the face of said blow head member having a plurality of grooves therein adapted to coincide with said vent openings in the top face of the mold, passages formed in said blow head member connecting said grooves with said annular passage and a port in said blow head member connected to said annular passage and adapted for connection with vacuum producing means.

2. In combination, a finishing mold having a closed bottom mold cavity adapted to receive a hollow blank in its plastic state to be formed into a finished hollow article provided with a neck and provided with vent openings extending from the mold cavity to the exterior of the mold and terminating at the top surface of the mold, a blow head adapted for cooperation with said mold comprising a hollow stem, an air delivering tube extending through and projecting beyond said stem for projection into the mold cavity, a control valve mounted at the upper end of said stem controlling the ingress of air under compression through said tube and the egress of air from the interior of the article to be formed through said stem, and a blow head member supported from the bottom end of said stem, said member having a bottom face formed to make sealing engagement with the top face of the mold and provided with an interior recess for the reception of a container neck, said recess having a top opening communicating with said hollow stem and accommodating the air inlet tube, an annular passage formed in said head concentric with said recess, the face of said member having inlet passages adapted for coincident relationship with the vent openings in the mold and air passages connecting said inlet passages with said annular passage, said annular passage having a port adapted for connection with vacuum producing means.

OTTO H. SAMUELSON.

REFERENCES CITED

The following references are of record in the file of this patent:

UNITED STATES PATENTS

| Number | Name | Date |
| --- | --- | --- |
| 417,176 | Haines | Dec. 10, 1889 |
| 781,685 | Shirley et al. | Feb. 7, 1905 |
| 1,177,613 | Garwood et al. | Apr. 4, 1916 |
| 1,577,131 | La France | Mar. 16, 1926 |
| 1,586,072 | Crispin et al. | May 25, 1926 |
| 1,894,100 | Kadow | Jan. 10, 1933 |
| 1,955,765 | Peiler | Apr. 24, 1934 |
| 1,956,203 | Rowe | Apr. 24, 1934 |
| 2,071,295 | Bridges | Feb. 16, 1937 |
| 2,282,848 | Berthold | May 12, 1942 |
| 2,382,028 | Samuelson et al. | Aug. 14, 1945 |

FOREIGN PATENTS

| Number | Country | Date |
| --- | --- | --- |
| 595,709 | France | July 24, 1925 |
| 331,686 | Italy | Nov. 13, 1935 |